US009870358B2

(12) United States Patent
Le Chevalier et al.

(10) Patent No.: US 9,870,358 B2
(45) Date of Patent: Jan. 16, 2018

(54) AUGMENTED READING SYSTEMS

(71) Applicant: Chegg, Inc., Santa Clara, CA (US)

(72) Inventors: Vincent Le Chevalier, San Jose, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 266 days.

(21) Appl. No.: 14/015,674

(22) Filed: Aug. 30, 2013

(65) Prior Publication Data
US 2014/0281903 A1 Sep. 18, 2014

Related U.S. Application Data

(60) Provisional application No. 61/779,768, filed on Mar. 13, 2013.

(51) Int. Cl.
*G06F 17/00* (2006.01)
*G06F 17/30* (2006.01)

(52) U.S. Cl.
CPC .. *G06F 17/30011* (2013.01); *G06F 17/30663* (2013.01)

(58) Field of Classification Search
CPC ................................. G06F 17/30011
See application file for complete search history.

(56) References Cited

U.S. PATENT DOCUMENTS

| | | | |
|---|---|---|---|
| 6,009,198 A * | 12/1999 | Syeda-Mahmood | G06K 9/00463 382/173 |
| 8,996,350 B1 * | 3/2015 | Dub | G06F 17/30011 704/1 |
| 2003/0115284 A1 * | 6/2003 | Henry | G06F 17/30876 709/217 |
| 2005/0193330 A1 | 9/2005 | Peters | |
| 2006/0059162 A1 * | 3/2006 | Rizk | G06F 17/30011 |
| 2006/0251339 A1 * | 11/2006 | Gokturk | G06F 17/30253 382/305 |
| 2008/0082903 A1 | 4/2008 | McCurdy et al. | |
| 2008/0162474 A1 * | 7/2008 | Thong | G06F 17/30011 |
| 2008/0275871 A1 | 11/2008 | Berstis et al. | |

(Continued)

OTHER PUBLICATIONS

International Search Report and Written Opinion for International Application No. PCT/US2014/021140, dated Jun. 12, 2014, 13 pages.

*Primary Examiner* — Scott Baderman
*Assistant Examiner* — Barbara Level
(74) *Attorney, Agent, or Firm* — Fenwick & West LLP

(57) ABSTRACT

An augmented reading system distributes electronic content related to paper documents. A user reading a paper document captures an image of a page of the paper document via a computing device communicatively coupled to the augmented reading system. The augmented reading system receives the image and correlates the image to electronic documents to identify the paper document. The augmented reading system may perform an image-based comparison or a character-based comparison to correlate the image with electronic documents. Additional electronic content related to the identified document is retrieved and delivered to the computing device of the user. Accordingly, the augmented reading system provides a bridge between paper documents and digital content and services.

21 Claims, 11 Drawing Sheets

(56) References Cited

U.S. PATENT DOCUMENTS

2009/0154778 A1* 6/2009 Lei ..................... G06K 9/00456
                                                         382/112
2010/0278453 A1   11/2010 King
2011/0035656 A1*  2/2011 King .................... G06F 17/211
                                                         715/234
2011/0261030 A1   10/2011 Bullock

* cited by examiner

AUGMENTED READING SYSTEMS

CROSS REFERENCE TO RELATED APPLICATIONS

This application claims the benefit of U.S. Provisional Application No. 61/779,768, filed Mar. 13, 2013, which is incorporated by reference in its entirety.

BACKGROUND

Field of the Invention

This invention relates generally to augmented reading, and more particularly to distributing electronic content related to paper documents.

Description of the Related Art

The rapid shift to mobile Internet services is bringing content offerings to an increasingly larger number of connected devices. Experiences previously limited to a single device are now accessible across multiple devices as high volume consumer electronic platforms such as smart phones, tablets, eReaders, game systems, Internet TVs, and wearable devices have become new channels to receive digital documents and services. Popular electronic book services leverage standardized publishing formats to seamlessly integrate and synchronize digital document reading experiences across consumer devices. As digital documents are shifting from a static model to a connected one where related, personalized, and other social content are being aggregated dynamically within the original document, it becomes strategic for publishing platforms and their distribution systems to be able to decouple distribution of these new individual content layers and the original document, while properly authoring and managing these layers among a plurality of users.

But while providing excellent user reading experience for this new digital medium remains a focus of the commercially available eReading systems and applications, it has been so far much more difficult to integrate electronic content and services with physical paper documents. Because paper documents are inherently static, the dynamic user experience and enhanced security of digital documents are not available to users reading paper documents.

SUMMARY

An augmented reading system distributes electronic content related to paper documents. A user reading a paper document captures an image of a page of the paper document via a computing device communicatively coupled to the augmented reading system through an authenticated web session. The augmented reading system receives the image and correlates the image to electronic documents to identify the paper document. In one embodiment, the electronic documents comprise markup language page elements that collectively reconstruct the electronic documents with page fidelity to a corresponding paper document. To correlate the received image to electronic documents, the augmented reading system may compare a layout of the document page in the received image to layouts of pages of the electronic documents. Alternatively, the augmented reading system may correlate the received image to electronic documents by comparing strings of characters extracted from the received image to strings of characters in the electronic documents.

After identifying an electronic document corresponding to the paper document, the augmented reading system retrieves electronic content related to the identified document. The related content is delivered to a connected device of the user. Accordingly, the augmented reading system provides a bridge between the printed document and electronic content and services, enabling readers of paper documents to access other content service layers associated with the paper document from connected devices.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
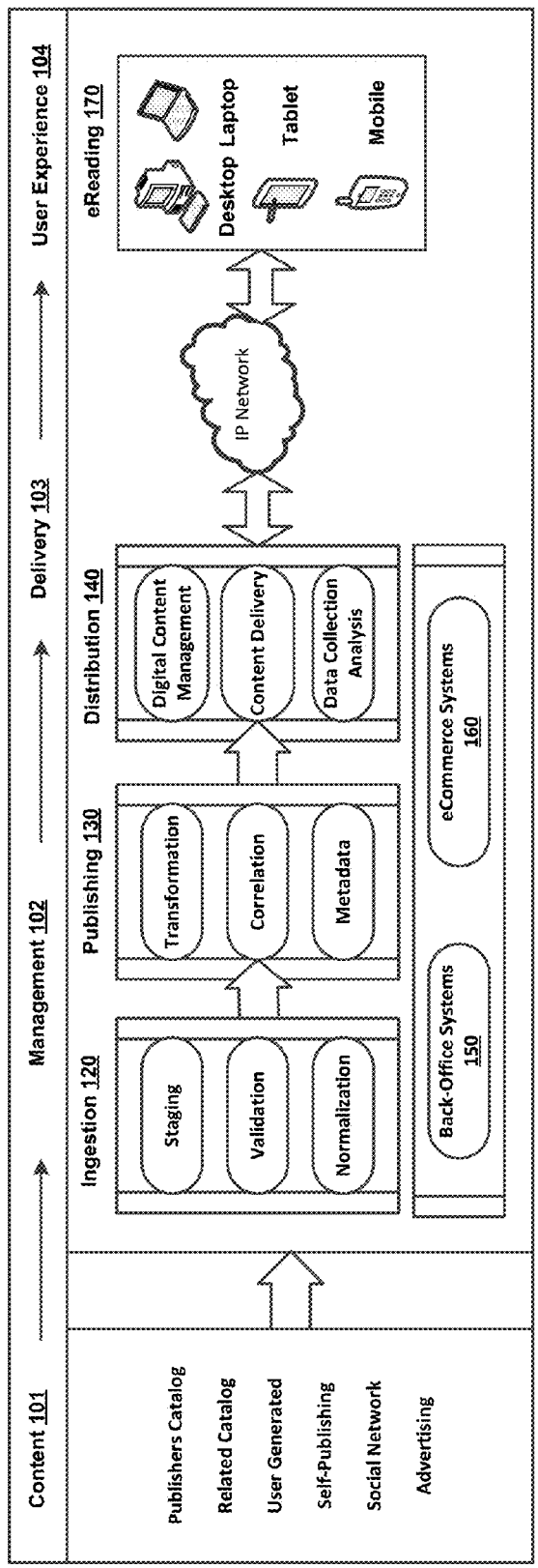
FIG. 1 illustrates an example digital publishing environment, according to one embodiment.

Embodiments of the invention provide a method for distributing electronic content related to paper documents. The method is organized around a digital publication and reading platform configured to aggregate, manage, and distribute multilayered content. FIG. 1 is a high-level block diagram illustrating the platform environment, organized around four function blocks: content 101, management 102, delivery 103, and experience 104.

Content block 101 automatically gathers and aggregates content from a large number of sources, categories, and partners. Whether the content is curated, perishable, on-line, or personal, these systems define the interfaces and processes to automatically collect various content sources into a formalized staging environment.

Management block 102 comprises five blocks with respective submodules: ingestion 120, publishing 130, distribution 140, back office system 150, and eCommerce system 160. The ingestion module 120, including staging, validation, and normalization subsystems, ingests published documents that may be in a variety of different formats, such as PDF, ePUB2, ePUB3, SVG, XML, or HTML. The ingested document may be a book, such as a textbook, a set of self-published notes, or any other published document, and may be subdivided in any manner. For example, the ingested document may have a plurality of pages organized into chapters, which could be further divided into one or more sub-chapters. Each page may have text, images, tables, graphs, or other items distributed across the page.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

The page structure information is assembled into a document-specific table of contents describing locations of chapter headings and sub-chapter headings within the reconstructed document, as well as locations of content within each heading. During reconstruction, document metadata describing a product description, pricing, and terms (e.g., whether the content is for sale, rent, or subscription, or whether it is accessible for a certain time period or geographic region, etc.) are also added to the reconstructed document.

The reconstructed document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure. The process performed by the publishing system 130 to reconstruct a document and generate a table of contents is described further with respect to FIG. 2.

The distribution system 140 packages content for delivery, uploads the content to content distribution networks, and makes the content available to end users based on the content's digital rights management policies. In one embodiment, the distribution system 140 includes digital content management, content delivery, and data collection and analysis subsystems.

Whether the ingested document is in a markup language document or is reconstructed by the publishing system 130, the distribution system 140 may aggregate additional content layers from numerous sources into the ingested or reconstructed document. These layers, including related content, advertising content, social content, and user-generated content, may be added to the document to create a dynamic, multilayered document. For example, related content may comprise material supplementing the foundation document, such as study guides, testing materials, solutions manuals, glossaries, journal articles, and terms listings. Advertising content may be uploaded by advertisers or advertising agencies to the publishing platform, such that advertising content may be displayed with the document. Social content may be uploaded to the publishing platform by the user or by other nodes (e.g., classmates, teachers, authors, etc.) in the user's social graph. Examples of social content include interactions between users related to the document and content shared by members of the user's social graph. User-generated content includes annotations made by a user during an eReading session, such as highlighting or taking notes. In one embodiment, user-generated content may be self-published by a user and made available to other users as a related content layer associated with a document or as a standalone document.

As layers are added to the reconstructed document, page information and metadata of the document are referenced by all layers to merge the multilayered document into a single reading experience. The publishing system 130 may also add information describing the supplemental layers to the reconstructed document's table of contents. Because the page-based document ingested into the management block 102 or the reconstructed document generated by the publishing system 130 is referenced by all associated content layers, the ingested or reconstructed electronic document is referred to herein as a "foundation document," while the "multilayered document" refers to a foundation document and the additional electronic content layers associated with the foundation document.

The back-office system 150 of management block 102 enables business processes such as human resources tasks, sales and marketing, customer and client interactions, and technical support. The back-office system 150 also manages interactions with customers, clients, and sales.

The eCommerce system 160 interfaces with back office system 150, publishing 130, and distribution 140 to integrate marketing, selling, servicing, and receiving payment for digital products and services. The eCommerce system 160 offers a web store for users to purchase or rent textbooks, trade books, other educational documents, white papers, brochures, travel guides, or other types of documents. Documents may be available for purchase through the web store in both paper and electronic formats. Additional content related to the documents may also be made available to end users through the web store provided by the eCommerce system 160. In one embodiment, the eCommerce system 160 stores records of users' purchases. A user's purchase of a document, whether as a sale or a rental, is referred to herein as "entitlement."

Delivery block 103 of a digital publication and reading platform distributes content for user consumption by, for example, pushing content to edge servers on a content delivery network. Experience block 104 manages user interaction with the publishing platform through browser application 170 by updating content, reporting users' reading activities, and assessing network performance.

In the example platform environment illustrated in FIG. 1, content is served dynamically and mostly on-demand. Content download may be authorized granularly, such as one page at a time. In one embodiment, the content is made available to end users through time-sensitive dedicated URLs which only stay valid for a limited time, for example a few minutes in one embodiment, all under control of the platform service provider.

In one embodiment, the platform environment illustrated in FIG. 1 is an educational digital publication and management platform integrating various course management services for instructors and students. For example, students may purchase or acquire electronic or paper course materials and textbooks through the educational platform, which integrates the students'studying and coursework with the course materials. Instructors may use the educational platform to access course materials, communicate with students or other instructors, and self-publish and distribute course materials. In other embodiments, the platform environment illustrated in FIG. 1 may integrate digital and paper content for applications other than educational. For example, the platform environment illustrated in FIG. 1 may be used to integrate digital services with paper publications outside of an educational environment, such as maps, brochures, or travel guides. As another example, a company may use embodiments of the platform environment described herein to manage distribution of documents throughout the company.

Document Reconstruction

The publishing system 130 receives original documents for reconstruction from the ingestion system 120 illustrated in FIG. 1. In one embodiment, a series of modules of the publishing system 130 are configured to perform the document reconstruction process.

Figure 2:
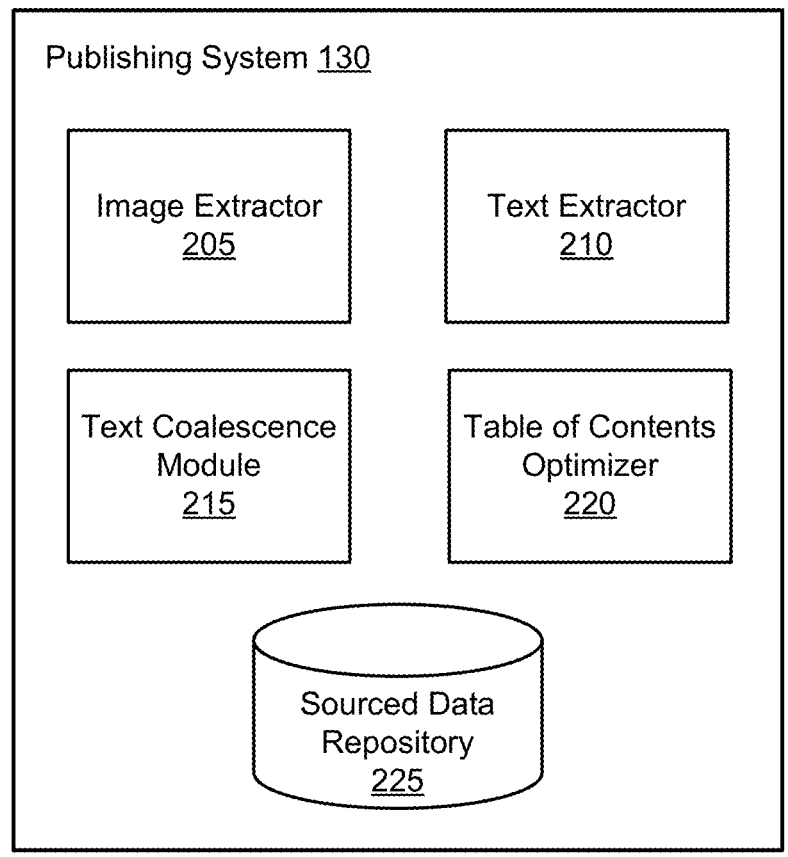
FIG. 2 is a block diagram illustrating modules within a publishing system, according to one embodiment.

FIG. 2 illustrates modules within the publishing system 130 for reconstructing a document. In one embodiment, document reconstruction is performed by an image extractor 205, a text extractor 210, a text coalescence module 215, and a table of contents optimizer 220. In other embodiments, the publishing system 130 may include different and/or additional modules.

The publishing system 130 ingests original document pages in digital formats, such as PDF or ePUB, and converts the ingested pages into an image format, such as BMP or TIFF. The converted images are stored in the sourced data repository 225 as sourced data images for page fidelity testing and correlation with images of printed documents.

The publishing system 130 converts the ingested document pages into a set of markup language page elements that collectively preserve page fidelity of rendered pages to the sourced data images. Embodiments of the conversion process are described herein with reference to an original document in the Portable Document Format (PDF) that is ingested into the publishing system 130. However, the format of the original document is not limited to PDF; other unstructured document formats can also be reconstructed into a markup language format by a similar process.

A PDF page contains one or more content streams, which include a sequence of objects, such as path objects, text objects, and external objects. A path object describes vector graphics made up of lines, rectangles, and curves. A path can be stroked or filled with colors and patterns as specified by the operators at the end of the path object. A text object comprises character stings identifying sequences of glyphs to be drawn on the page. The text object also specifies the encodings and fonts for the character strings. An external object XObject defines an outside resource, such as a raster image in JPEG format. An XObject of an image contains image properties and an associated stream of the image data.

The image extractor 205 identifies graphical objects within a page and determines their respective regions and bounding boxes. In one embodiment, the image extraction process performed by the image extractor 205 first identifies graphical operations within the page. For example, a path object in a PDF page may include multiple path construction operators that describe vector graphics made up of lines, rectangles, and curves.

The image extractor 205 extracts metadata associated with each of the images in the document page, such as resolutions, positions, and captions of the images. Resolution of an image is often measured by horizontal and vertical pixel counts in the image; higher resolution means more image details. The image extraction process may extract the image in the original resolution as well as other resolutions targeting different eReading devices and applications. For example, a large XVGA image can be extracted and down sampled to QVGA size for a device with QVGA display. The image extractor 205 also determines the position information of each image. The position information of the images can be used to provide page fidelity when rendering the document pages in eReading browser applications, especially for complex documents containing multiple images per page. The image extractor 205 may also extract a caption associated with each image that defines the content of the image by searching for key words, such as "Picture", "Image", and "Tables", from text around the image in the original page. The extracted image metadata for the page may be stored to the overall document metadata and indexed by the page number.

The image extractor 205 may also extract tables, comprising graphics (horizontal and vertical lines), text rows, and/or text columns. The lines forming the tables can be extracted and stored separately from the rows and columns of the text.

The image extraction process may be repeated for all the pages in the ingested document until all images in each page are identified and extracted. At the end of the process, an image map that includes all graphics, images, tables and other graphic elements of the document is generated.

The text extractor 210 extracts text and embedded fonts from the original document and identifies the location of the text elements on each page. In one embodiment, the text extractor 210 determines a Unicode character mapping for each glyph in a document to be reconstructed. The mapping ensures that no two glyphs are mapped to a same Unicode character. To achieve this goal, the text extractor 210 defines and follows a set of rules including applying the Unicode mapping found in the embedded font file; determining the Unicode mapping by looking up postscript character names in a standard table, such as a system TrueType font dictionary; and determining the Unicode mapping by looking for patterns, such as hex codes, postscript name variants, and ligature notations.

For those glyphs or symbols that cannot be mapped by following the above rules, the text extractor 210 may apply pattern recognition techniques on the rendered font to identify Unicode characters. If pattern recognition is still unsuccessful, the text extractor 210 may map the unrecognized characters into the private use area (PUA) of Unicode. In this case, the semantics of the characters are not identified, but the encoding uniqueness is guaranteed. As such, rendering ensures fidelity to the original document.

The text extractor 210 tags the pages in the original document having text. In one embodiment, the text extractor 210 identifies all the pages with one or more text objects in the original document. Alternatively, the text extractor 210 may mark only the pages without any embedded text.

The text extractor 210 extracts text from the pages of the original document tagged as having text. The text extraction may be done at the individual character level, together with markers separating words, lines, and paragraphs. The extracted text characters and glyphs are represented by the Unicode character mapping determined for each. The position of each character is identified by its horizontal and vertical locations within a page. For example, if an original page is in A4 standard size, the location of a character on the page can be defined by its X and Y location relative to the A4 page dimensions. In one embodiment, text extraction is performed on a page-by-page basis. The text extractor 210 may also extract embedded fonts from the original document, which are stored and referenced by client devices for rendering the text content.

The output of the text extractor 210 is, therefore, a dataset referenced by the page number, comprising the characters and glyphs in a Unicode character mapping with associated location information and embedded fonts used in the original document.

The text coalescence module 215 coalesces the text characters extracted by the text extractor 210. In one embodiment, the text coalescing module 310 assembles the extracted text characters into words, words into lines, lines into paragraphs, and paragraphs into bounding boxes and regions. These steps leverage the known attributes about extracted text in each page, such as information on the text position within the page, text direction (e.g., left to right, or top to bottom), font type (e.g., Arial or Courier), font style (e.g., bold or italic), expected spacing between characters based on font type and style, and other graphics state parameters of the pages.

In one embodiment, the text coalescence module 215 assembles extracted text characters into words based on spacing. The text coalescence module 215 may analyze the spacing between adjacent characters and compare the spacing to the expected character spacing based on the known text direction, font type, style, and size, as well as other graphics state parameters, such as character-spacing and zoom level. Despite different rendering engines adopted by the browser applications 170, the average spacing between adjacent characters within a word is smaller than the spacing between adjacent words. For example, a string of "Berriesaregood" represents extracted characters without considering spacing information. Once taking the spacing into consideration, the same string becomes "Berries are good," in which the average character spacing within a word is smaller than the spacing between words.

The text coalescence module 215 may additionally or alternatively assemble extracted text characters into words based on semantics. For example, the string of "Berriesaregood" may be input to a semantic analysis tool, which matches the string to dictionary entries or Internet search terms, and outputs the longest match found within the string. The outcome of this process is a semantically meaningful string of "Berries are good." In one embodiment, the text coalescence module 215 analyzes the same text by both spacing and semantics, so that word grouping results may be verified and enhanced.

The text coalescence module 215 assembles words into lines by determining an end point of each line of text. Based on the text direction, the text coalescence module 215 computes and averages the horizontal spacing between words. The end point may have word spacing larger than the average spacing between words. For example, in a two-column page, the end of the line of the first column may be identified based on it having a spacing value much larger than the average word spacing within the column. On a single column page, the end of the line may be identified by the space after a word extending to the side of the page or bounding box.

After determining the end point of each line, the text coalescence module 215 assembles lines into paragraphs. Based on the text direction, the text coalescence module 215 may compute and average the vertical spacing between consecutive lines. The end of the paragraph may have a vertical spacing that is larger than the average. Additionally or alternatively, the text coalescence module 215 may apply semantic analysis to relate syntactic structures of phrases and sentences, so that meaningful paragraphs can be formed.

The text coalescence module 215 assembles the identified paragraphs into bounding boxes or regions. In one embodiment, the paragraphs may be analyzed based on lexical rules associated with the corresponding language of the text. The text coalescence module 215 may execute a semantic analyzer to identify punctuation at the beginning or end of a paragraph. For example, a paragraph may be expected to end with a period. If the end of a paragraph does not have a period, the paragraph may continue either on a next column or a next page. The text coalescence module 215 may analyze the syntactic structures of the paragraphs to determine the text flow from one paragraph to the next, and may combine two or more paragraphs based on the syntactic structure. If multiple combinations of the paragraphs are possible, the text coalescence module 215 may reference an external lexical database, such as WORDNET®, to determine which paragraphs are semantically similar.

The table of contents optimizer 220 indexes content of the reconstructed document. In one embodiment, the table of contents optimizer 220 aggregates the indexed content into a document-specific table of contents that describes the structure of the document at the page level. For example, when converting printed publications into electronic documents with preservation of page fidelity, it may be desirable to keep the digital page numbering consistent with the numbering of the original document pages.

The table of contents optimizer 220 may optimize different levels of the table. At the primary level, the table of contents optimizer 220 searches for chapter headings within the original document, such as headings for a preface, chapter numbers, chapter titles, an appendix, and a glossary. The table of contents optimizer 220 may identify a chapter heading based on the spacing between chapters. Alternatively, the table of contents optimizer 220 may identify a chapter heading based on the font face, including font type, style, weight, or size. For example, the headings may have a font face that is different from the font face used throughout the rest of the document. After identifying the headings, the table of contents optimizer 220 retrieves the number of the page on which each heading is located.

At a secondary level, the table of contents optimizer 220 searches for sub-chapter headings within the original document, such as dedications and acknowledgments, section titles, image captions, and table titles. The table of contents optimizer 220 may determine the vertical spacing between sections and segment each chapter according to the section spacing. Based on text at the beginning of each section, for example, the table of contents optimizer 220 identifies a sub-chapter heading font face. The table of contents optimizer 220 may parse each chapter to identify all occurrences of the sub-chapter heading font face, and determine the page number associated with each identified sub-chapter heading.

HTML5 eReading Environment

Figure 3A:
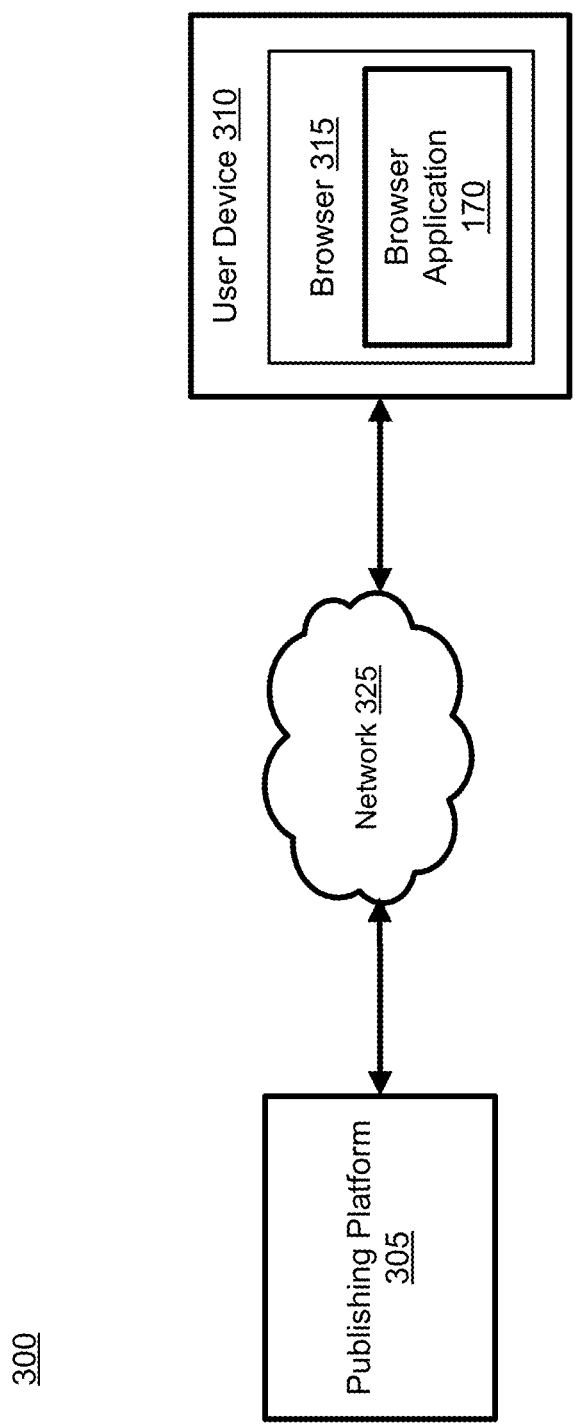
FIG. 3A illustrates an eReading environment, according to one embodiment.

FIG. 3A illustrates an eReading environment 300 including a publishing platform 305 and a user device 310. One user device 310 is illustrated in FIG. 3, but any number of user devices 310 may communicate with platform 305 to access the content distributed by platform 305. Each device 310 executes a web browser 315 and at least one browser application 170. In one embodiment, each user is associated with an account on the publishing platform 305, and content purchased by the user through the platform 305 is made available through the user account. In one embodiment, the user device 310 may also be registered to the account to authorize the device for accessing content. Alternatively, the publishing platform 305 may establish an authenticated web session on a device 310 when the user requests to access content and services of the platform 305 from the device 310, including content and services related to paper documents. During the time that an authenticated web session is established on the device 310, the device 310 is referred to as a "connected device." Furthermore, a user may access and interact with multilayered content synchronously on a plurality of devices 310. For example, a user may simultaneously use one or more devices 310, such as a desktop computer, a laptop, a smart phone, a tablet, an eReader, an Internet television, a wearable device (such as smart glasses), or any other device including computing functionality and data communication capabilities, to interact with a multilayered document distributed by the publishing platform 305.

Aspects of the publishing platform 305 may function similarly to the systems 120, 130, and 140 described with reference to the management block 102 of FIG. 1. The publishing platform 305 delivers multilayered content to the browser application 170 executing on the user device 310 through the network 325. The browser application 170 fetches content from the platform 305 in small increments, such as one page at a time. Alternatively, the user device 310 may cache one or more pages of the document to enable faster retrieval of the pages.

Contrary to other existing digital publishing services, the educational digital publication and reading platform of the present invention allows the user to access content without downloading a specific reading application from the publisher. Rather, the browser application 170, comprising client software compatible with the web browser 315, constructs document pages using structureless HTML5 elements. It should be noted that browser applications 170 comprise eReading applications as well as supplemental content applications that function in the browser environment to support the user's eReading activities and overall engagement with the multilayered documents distributed by the platform, such as notepad applications, social applications, testing applications, and advertising applications. In one embodiment, the browser application 170 integrates a number of a user's reading activities, including reading the content, navigating between pages, creating highlights, interacting with advertisements, generating social content, taking notes in relation to the content of the document, creating automated testing materials associated with a document, and interacting with the automated testing materials.

For example, the browser application 170 may upload user-generated content to the publishing platform 305. The uploaded user-generated content is stored and archived into the on-line end user account so that it may be synchronized across all registered devices 310 for a given end user. Thus, the end user's content can be accessed from any of the user's registered devices.

Communication between the publishing platform 305 and user device 310 is enabled by network 325. In one embodiment, the network 325 uses standard communications technologies and/or protocols. Thus, the network 325 can include links using technologies such as Ethernet, 802.11, worldwide interoperability for microwave access (Wi-MAX), 3G, Long Term Evolution (LTE), digital subscriber line (DSL), asynchronous transfer mode (ATM), InfiniBand, PCI Express Advanced Switching, etc. Similarly, the networking protocols used on the network 325 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 325 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 325 can also include links to other networks such as the Internet.

Figure 3B:
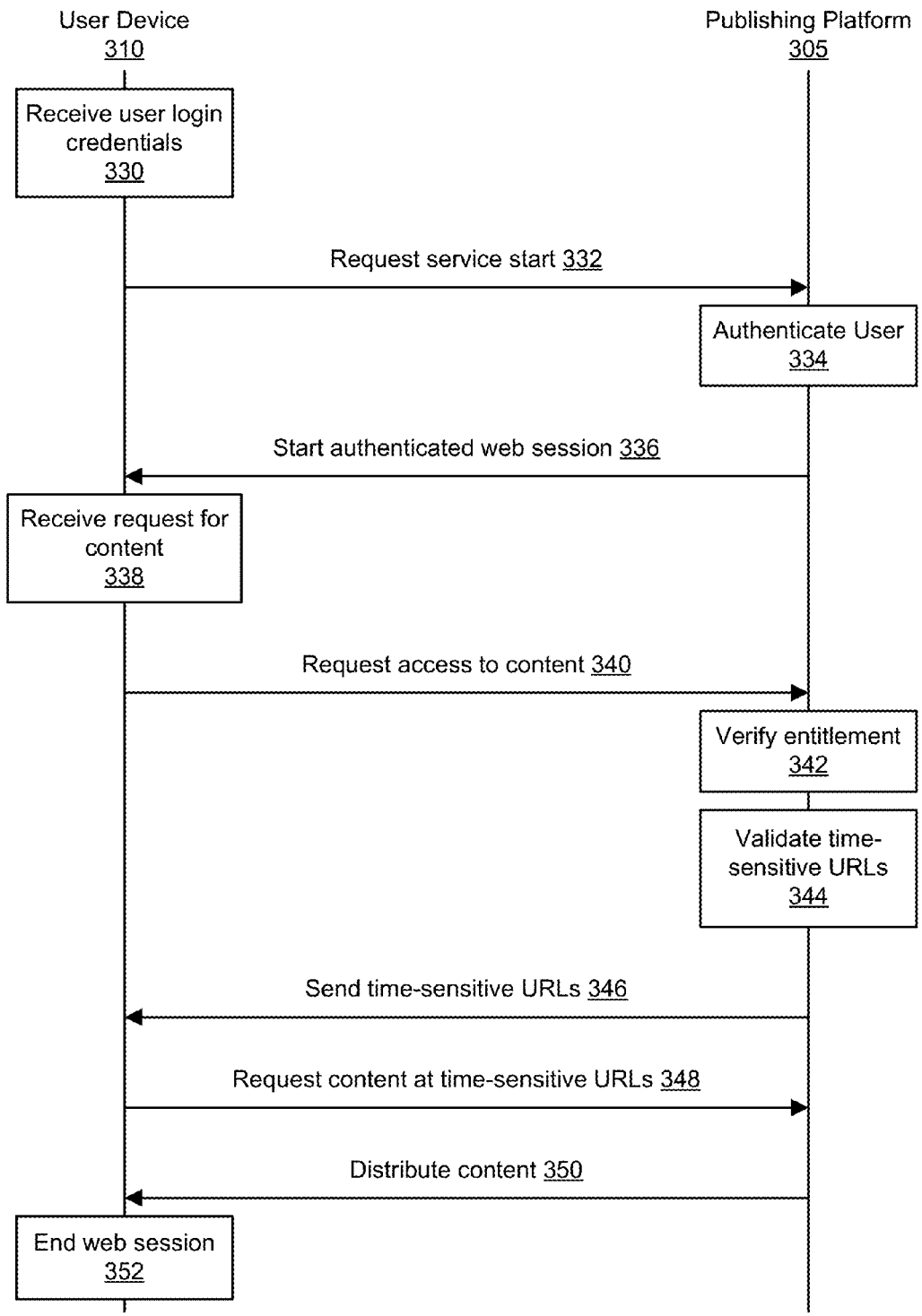
FIG. 3B is an interaction diagram with event traces illustrating a process for distributing content within an eReading environment, according to one embodiment.

FIG. 3B is an interaction diagram with event traces illustrating a process for distributing content from the platform 305 to a user device 310 in the eReading environment 300, according to one embodiment. In the diagram, time flows from top to bottom of the figure and horizontal arrows between entities represent communications. Other embodiments may include different and/or additional steps, and the steps of the distribution process may be performed in different orders.

The device 310 receives 330 login credentials from a user. In one embodiment, the device 310 receives 330 receives the user login credentials at a browser application 170 executing on the device 310. The device 310 sends the user's login credentials to the publishing platform 305 to request 332 to start electronic content services. Using the login credentials, the publishing platform 305 authenticates 334 the user. If the user is authenticated 334, the publishing platform 305 starts 336 an authenticated web session on the device 310.

The user device 310 receives 338 a request from the user to access content or services of the publishing platform 305. In one embodiment, the content request comprises an image of a paper document the user is reading. The content request may be a request for access to a set of pages of content distributed by the platform 305, which may start at the beginning of a document, at the last page a user was reading in a previous session, or at a page corresponding to the page of the paper document the user is reading. The set of pages can be a single page or a block of pages. The user device 310 sends 340 the request to the publishing platform 305.

The publishing platform 305 verifies 342 whether the user is entitled to access the requested content. For example, the user may be entitled to access the content if the user has purchased a license to the content, or if the user created the requested content. If the entitlement is verified 342, the publishing platform 305 creates and/or validates 344 time-sensitive URLs including links to the markup language elements and metadata needed to render the requested content on the device 310. The time-sensitive URLs are only valid for a short period of time and become invalid once the time expires. Furthermore, the time-sensitive URLs may be obfuscated to prevent unauthorized distribution of the URLs. Using the time-sensitive URLs, the platform 305 provides access to content without the device 310 downloading the content from the platform 305.

The publishing platform 305 sends 346 the time-sensitive URLs to the device 310, which uses the URLs to request 348 the markup language elements and metadata stored at the location indicated by the URLs. The publishing platform 305 distributes 350 the markup language elements and metadata to the device 310, where the markup language elements are rendered using the metadata to display the requested content to the user.

Steps 338-350 may be repeated indefinitely throughout a web session. For example, the user may request 338 access to a next page or set of pages of content. In response, the device 310 and publishing platform 305 perform steps 340 through 350 to display the next page to the user. It is noted that the device 310 is a "connected device" during steps 338-350 of the process illustrated in FIG. 3B.

After a period of time, the user device 310 ends 352 the authenticated web session. A web session may end 352 in response to user activities (e.g., the user closing the browser application executing on the device 310), or may end 352 after a fixed period of time defined by the platform 305. For example, the web session may end 352 if the user does not request new content before a timeout period has elapsed. If the user desires to access content after the web session has ended 352, the user re-enters login credentials and the process illustrated in FIG. 3B is repeated.

Figure 4:
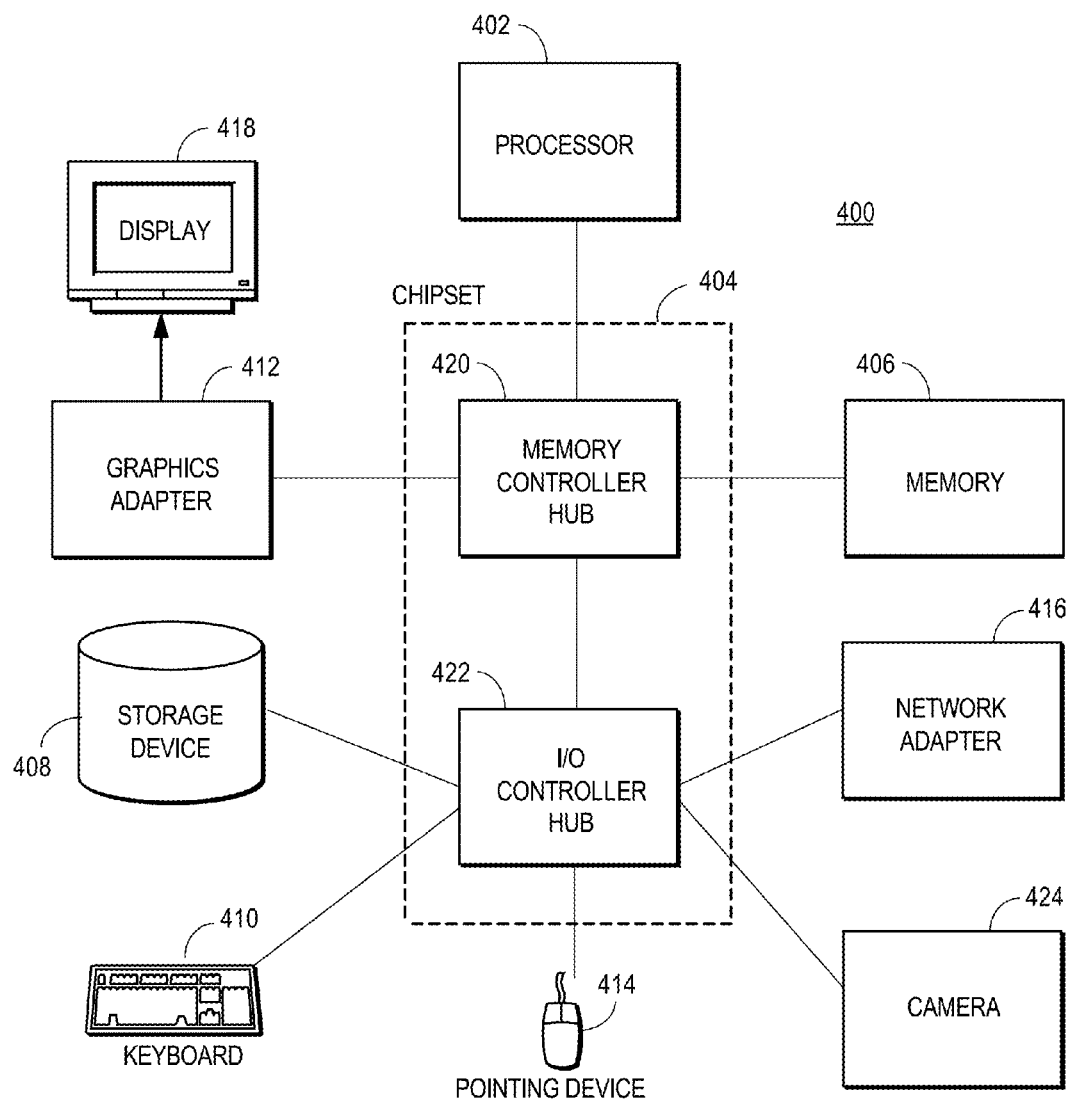
FIG. 4 is a high-level block diagram of a computer for use as a client device, according to one embodiment.

A high-level block diagram of a computer 400, as an example of a user device 310, is illustrated in FIG. 4. Illustrated are at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display device 418 is coupled to the graphics adapter 412. A storage device 408, keyboard 410, pointing device 414, camera 424, and network adapter 416 are coupled to the I/O controller hub 422. Other embodiments of the computer 400 have different architectures. For example, the memory 406 is directly coupled to the processor 402 in some embodiments.

The storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, or other type of pointing device, and is used in combination with the keyboard 410 to input data into the computer 400. The camera 424 captures images and/or videos, and inputs the captured images or videos into the computer 400. The graphics adapter 412 displays images and other information on the display device 418. The network adapter 416 couples the computer 400 to a network. Some embodiments of the computer 400 have different and/or other components than those shown in FIG. 4. The types of computer 400 can vary depending upon the embodiment and the desired processing power. Other computing devices may alternatively be used as the user device 310, such as a tablet, a smart phone, an Internet television, or a gaming console.

Publishing Platform

Figure 5:
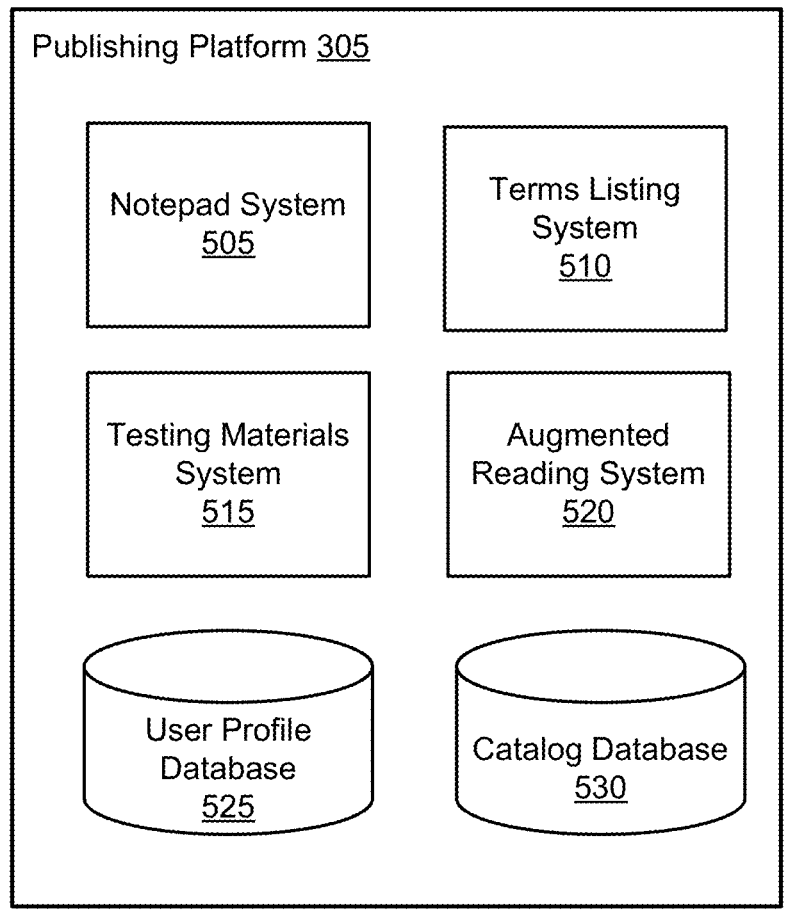
FIG. 5 is a block diagram illustrating subsystems within a publishing platform, according to one embodiment.

FIG. 5 is a block diagram illustrating subsystems within the publishing platform 305. In one embodiment, the publishing platform 305 comprises a notepad system 505, a terms listing system 510, a testing materials system 515, an augmented reading system 520, a user profile database 525, and a catalog database 530. Other embodiments of the publishing platform 305 may include fewer or more subsystems.

The user profile database 525 stores a user profile for each user of the publishing platform 305. Each user profile may include credentials for verifying the identity of the user, such as a username, password, and/or a reference picture of the user. A list of the user's purchases from the publishing platform 305 may also be stored in the user's profile, where the purchases may include electronic or paper foundation documents and supplemental content associated with the foundation documents. In embodiments where the publishing platform 305 is part of an educational management system, a user profile may also include the user's coursework, including courses the user is currently enrolled in, courses the user has completed, the user's programs of study (e.g., major and minor), educational institutions in which the user is or was enrolled, instructors of the respective courses, and documents associated with each course distributed by the publishing platform 305 (such as textbooks, study guides, assignments, and tests). A user profile may additionally or alternatively include other information relating to the corresponding user, such as connections in one or more social graphs, job title, and security clearance.

The catalog database 530 indexes the content of the publishing platform 305. Content item in the catalog database 530 may be associated with metadata describing related documents, a user associated with the content, and access conditions for the content. If a content item is related to a foundation document, the content item is indexed in the catalog database 530 with an identifier of the related foundation document. User-generated content items may be further indexed by an identifier of the user who created the content. For example, user-generated notes may be indexed by the document with which the notes are associated and the user who created the notes. Access conditions, which may be specified by an owner or author of content or a service, indicate which users can access the content and/or how access to the content may be authorized.

Notepad System

The notepad system 505 manages user-generated notes. As users read and interact with documents, the users may take notes via the browser applications 170. To take a note, a user indicates a location in the document with which to associate the note and enters desired note content into a note window displayed by the browser application 170. As used herein, the term "note" refers to the content entered into one note window. Note windows may support content in a variety of different formats, such as text, images, videos, and audio clips. The browser applications 170 upload the user-generated notes to the notepad system 505, which stores the notes in an electronic notepad document specific to the document with which the notes are associated and the user who took the notes. Each note inherits metadata describing user activities leading to the creation of the note, such as the user who created the note, an identifier of the document and the location within the document with which the note is associated, the time the note was created, and the type of content within the note (e.g., text or multimedia). The notepad system 505 stores the user-generated notepads and the note metadata in the catalog database 530.

In one embodiment, each stored note is linked to the section of the document that includes the location with which the note is associated. For example, if Chapter 1 of a book spans pages 1 and 2, and a user creates a note associated with a location on page 2, the notepad system 505 links the note to Chapter 1. Thus, the notepad system 505 indexes notes by the headers of the document sections with which the notes are associated, and accesses the notes using the headers of the document sections.

In one embodiment, the notepad system 505 aggregates multiple sets of user-generated notes. For example, a user may request to aggregate notes associated with multiple documents into a single set of notes. As another example, two users may request to aggregate their respective sets of notes associated with the same document into a single notes set. The notepad system 505 analyzes the metadata of the notes to be aggregated and generates combined metadata for each note. Based on the combined metadata, the notes are merged into a single aggregated set of notes. The aggregated notes retain their association to a particular page location in a document and have a link to that location.

Notes may be presented to users in a variety of formats. A browser application 170 can display notes in a panel adjacent to a page of the document with which the notes are associated. Based on the links between the notes and respective sections of the document generated by the notepad system 505, the browser application 170 may synchronize delivery of notes and document pages. For example, when a user is using a browser application 170 to read Chapter 1 of a book, the browser application 170 may retrieve and display the notes linked to Chapter 1. Alternatively, a browser application 170 can display notes as a standalone document.

Terms Listing System

The terms listing system 510 generates terms listings associated with foundation documents. In one embodiment, the terms listing system 510 identifies terms of a foundation document and definitions of the terms. Based on the identified terms and associated definitions, the terms listing system 510 generates a stand-alone electronic terms listing document configured for presentation to users through the browser applications 170.

A terms listing may include primary and/or secondary terms used in the foundation document, and primary and/or secondary definitions associated with the terms. As used herein, a "primary term" is a term extracted from a glossary associated with a foundation document. Similarly, a "primary definition" is a definition extracted from the glossary and associated with a primary term. Typically, a glossary is a listing of terms in a table view separated from the rest of the document by a heading or sub-heading, usually including a combination of a term, a definition associated with the term, and a page number indicating the location(s) at which the term appears in the associated document.

A "secondary term" is a term not originally appearing in a foundation document's glossary, but associated with the document based on user or platform activities. For example, secondary terms may be identified based on users'searches in relation to the foundation document. As browser applications 170 transmit users'searches to the publishing platform 305, the terms listing system 510 compiles a dynamic listing of the terms searched by the users in relation to a particular foundation document and identifies the searched terms (or a subset thereof) as secondary terms of the foundation document. As another example, the terms listing system 510 may identify secondary terms by retrieving terms from terms listings associated with similar foundation documents.

"Secondary definitions" may be content, such as dictionary definitions or encyclopedia entries, associated with a primary or secondary term but not appearing in a foundation document's original glossary. For example, the terms listing system 510 may retrieve a secondary definition of a primary or secondary term from an online dictionary, by feeding terms into an online translation system, or by retrieving synonyms from an online thesaurus.

The terms listing system 510 stores the identified terms and definitions in the catalog database 530 as a terms listing document associated with a foundation document. The terms listing document comprises markup language regions for each term or definition that can be independently delivered to browser application 170, providing several ways for users to view and interact with terms listings as an aid in their studying. For example, as a user is reading a page of a foundation document via a browser application 170, the browser application 170 may display the terms appearing on that page in a panel adjacent to the document page. As another example, terms and their associated definitions can be interleaved into a user-generated notepad and displayed with the notes. In yet another example, browser applications 170 can display terms and their associated definitions as a stand-alone document.

Testing Materials System

The testing materials system 515 generates and distributes testing documents associated with foundation documents. In one embodiment, the testing document is a set of self-study materials generated by a user as a supplement to the foundation document. For example, a student may use the testing materials system 515 to generate a set of flashcards associated with a textbook that include primary or secondary terms of the textbook and their associated definitions. The student can study the flashcards to learn the definitions of the terms in the textbook. In another embodiment, the testing document is configured as an assessment to be used, for example, as part of an educational course. For example, an instructor of a course may use the testing materials system 515 to generate a quiz to be delivered to students registered for the course.

The testing materials system 515 may generate testing documents from content extracted from a foundation document, retrieved from an online source, or added by a user. Testing documents are indexed in the catalog database 530 according to the foundation document with which they are associated. Testing documents may be associated with parameters specifying when, to whom, and how the testing document is to be delivered. For example, an instructor who uses the testing materials system 515 to generate a quiz for students in his course can specify when the quiz is to be made available to the students and which students will be given access to the quiz. The instructor can also specify other delivery conditions, such as a type of device the students must use to access the quiz and other materials the students can use while taking the quiz. The testing materials system 515 stores the delivery conditions in the catalog database 530 as metadata associated with corresponding testing documents.

Augmented Reading System

The augmented reading system 520 distributes electronic content related to paper documents. Paper documents may include paper textbooks, trade books, guide books, maps, financial summaries, legal documents, or any other type of content printed on paper that users physically interacts with. As a user is reading a paper document, the user captures at least one image of the paper document using a device 310 communicatively coupled to the publishing platform 305 by an authenticated web session executing on the device 310. The device uploads the image to the augmented reading system 520, which correlates the image with images of documents stored and/or distributed by the publishing platform 305 to identify the document. The augmented reading system 520 retrieves electronic content related to the identified document, and sends the related content to the user's device or to another device of the user connected to the publishing platform 305. Related content may include supplemental content purchased by the user (such as a study guide or solutions manual), content self-published by users of the publishing platform 305 (such as academic papers or master notes), user-generated notes, terms listings associated with the document, tests or other academic assignments from a course using the document, secured content of the document redacted prior to the document's printing, or services of the publishing platform 305 (such as access to an online store for purchasing other related content items, social network functions, or searching the printed document). Accordingly, the augmented reading system 520 provides a bridge between the printed document and electronic content and services, enabling readers of paper documents to access other content service layers associated with the paper document from connected devices.

Figure 6A:
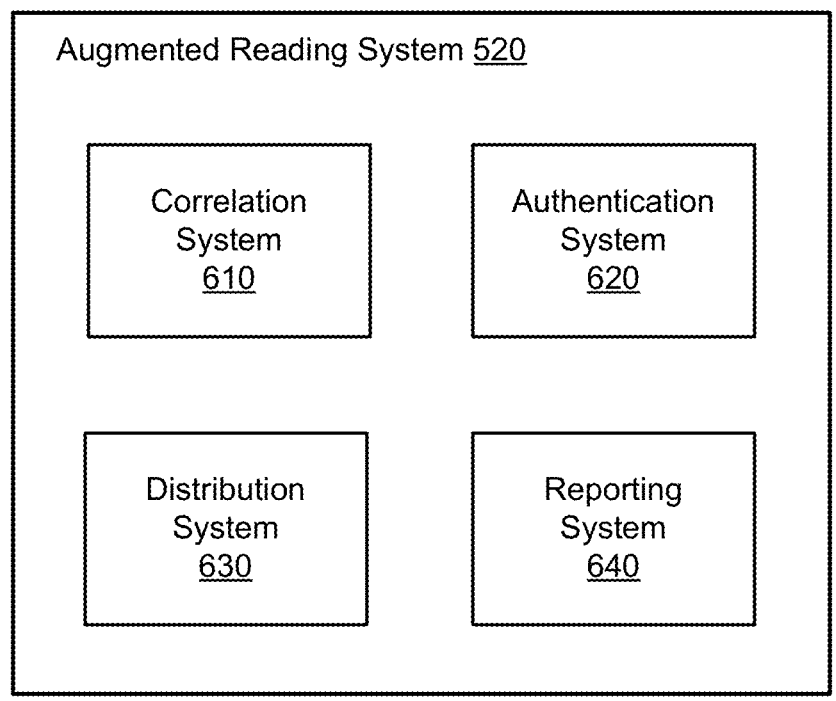
FIG. 6A is a block diagram illustrating subsystems within an augmented reading system, according to one embodiment.

FIG. 6A is a block diagram illustrating subsystems within the augmented reading system 520. In one embodiment, the augmented reading system 520 comprises a correlation system 610, an authentication system 620, a distribution system 630, and a reporting system 640.

The correlation system 610 receives images of paper documents uploaded to the platform 305 by users' devices 310. The correlation system 610 correlates the received images with documents stored by the publishing platform 305 to identify foundation documents corresponding to the paper documents. For each identified foundation document, the correlation system identifies content in the catalog database 530 that is related to the foundation documents. In one embodiment, the correlation system 610 identifies the related content by retrieving content from the catalog database 530 that is indexed by an identifier of the foundation document. The correlation system 610 may further filter the related content from the catalog database 530 by searching for content associated with the page or section of the paper document in the received image or content associated with the user who uploaded the image. The correlation system 610 is described in further detail with respect to FIG. 7.

For the related content items identified by the correlation system 610, the authentication system 620 authenticates delivery of the related content to users reading the paper documents. Authentication may include determining which of the related content items identified by the correlation system 610 the user is authorized to access. In one embodiment, the authentication system 620 authenticates access to the related content based on access conditions associated with the related content. For example, the authentication system 620 receives login credentials from a device 310 executing an authenticated web session, and authenticates the login credentials against credentials stored in user profiles. As another example, the authentication system 620 may compare an image of the user (uploaded contemporaneously with the image of the paper document page) to a reference image of the user stored in the user's user profile. If the uploaded image matches the reference image, the authentication system 620 may authenticate the user's access to the related content.

The distribution system 630 distributes related content identified by the correlation system 610 and authorized by the authentication system 620 to a connected device 310 of a user. Aspects of the distribution system 630 may function similarly to the delivery block 103 described with respect to FIG. 1. In one embodiment, the distribution system 630 interfaces between the correlation system 610 and the distribution systems of the publishing platform 305 for retrieving the related content identified by the correlation system 610 and distributing the related content to a connected device 310 of the end user.

In one embodiment, the distribution system 630 distributes the content and/or services related to a paper document by populating regions of a template with portions of the content or service. A template is a formatted document with regions configured to receive electronic content. The regions may be arranged in one or more pages, where each page is a set of regions intended to be simultaneously displayed on a user device 310. Regions may support various types of content, such as static HTML content, text entry container regions, radio buttons, checkboxes, or hyperlinks. In one embodiment, the distribution system 630 stores templates configured for display on various categories of user devices. For example, a template configured for display on a smart phone may have a single region per page, whereas a template configured for display on a desktop computer may have multiple regions per page. Additionally or alternatively, a template may include a navigation component, such as a scroll bar, for navigating to content extending beyond an initial display screen of the device 310. Thus, for example, a template may be an infinite stack of regions that a user can scroll through to view the content in the respective regions.

Figure 6B:
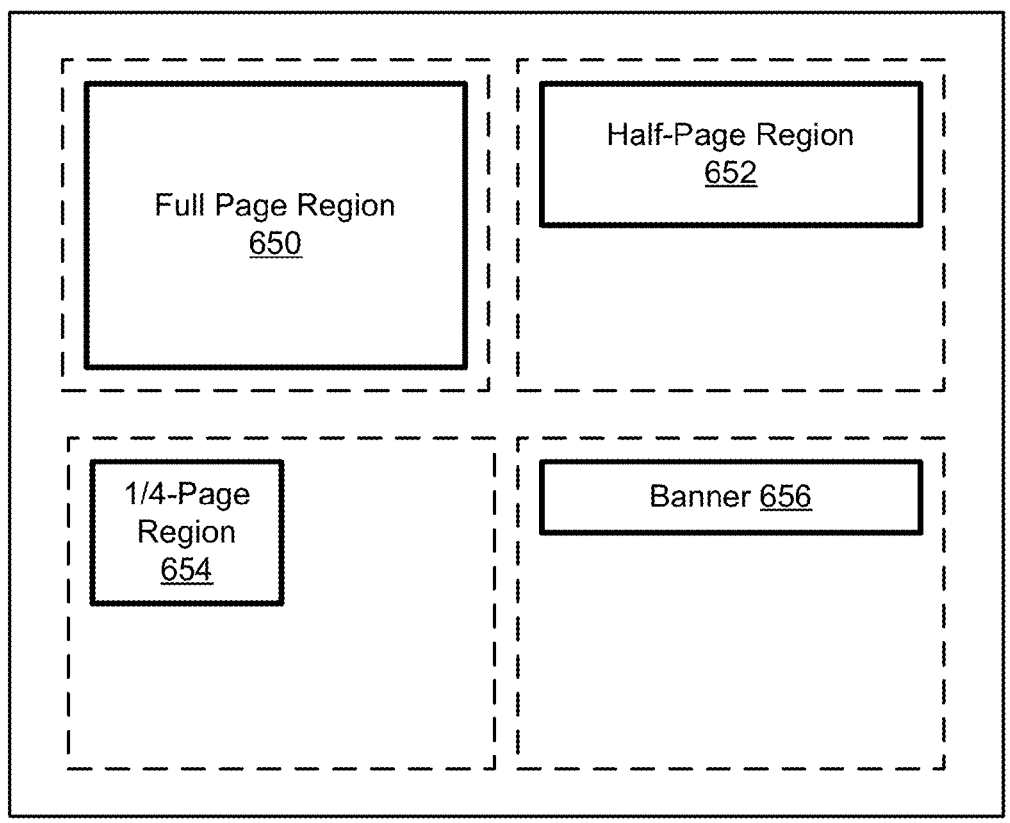
FIG. 6B illustrates examples of region formats supported by templates for electronic content, according to one embodiment.
Figure 6D:
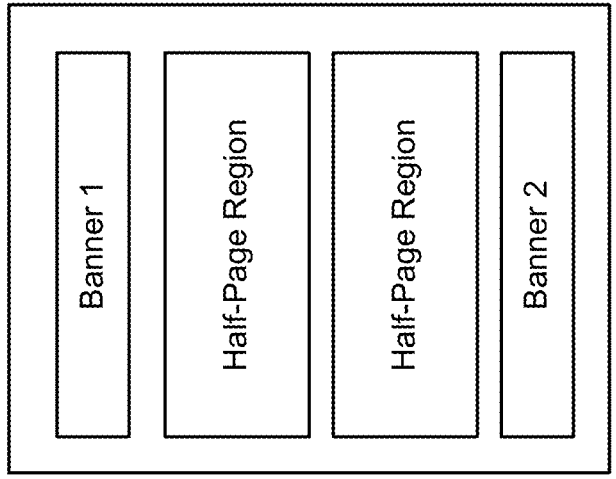
FIGS. 6C-D illustrate example template layouts, according to one embodiment.
Figure 6C:
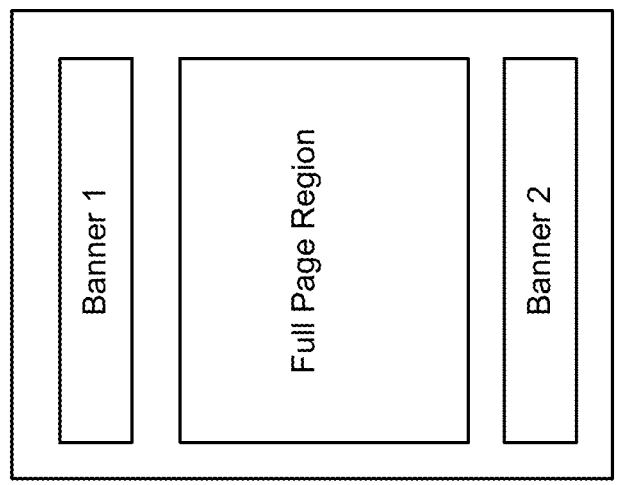

Various examples of templates that may be populated by the distribution system 630 are illustrated in FIGS. 6B-D. FIG. 6B illustrates example formats of the regions of the templates, including a full-page region 650, a half-page region 652, a quarter-page region 654, and a banner region 656. Using different combinations of related content identified by the correlation system 610 and region formats, numerous template layouts are possible. FIG. 6C illustrates an example layout 660, which includes a full-page region and two banner regions on each page of the template. FIG. 6D illustrates another example layout 670, which includes two half-page regions and two banner regions on each page. Many other layouts are possible.

In one embodiment, the distribution system 630 selects a template based on the type of related content identified by the correlation system 610 and/or the size of the display of the user device 310. For example, if the related content is a set of user-generated notes to be displayed on a user's smart phone, the distribution system 630 may select a template having an infinite stack of half-page regions. The distribution system 630 may then populate each region of the template with a respective note. As another example, if the related content is a video, the distribution system 630 may select a template having one full-page region for containing the video and two banner regions for displaying advertisements to the user while the user watches the video. It is noted that the distribution system 630 may populate a template with multiple types of related content. For example, the distribution system 630 may populate a single template with user-generated notes, terms and definitions of the document, and a search bar to enable the user to search the paper document. After populating a template with related content items identified by the correlation system 610 and authorized by the authenticated system 620, the distribution system 630 distributes one or more of the populated regions to the user device 310.

Returning to FIG. 6A, the reporting system 640 receives reports from user devices 310 related to the content delivered to the devices 310. In one embodiment, the devices 310 report issues that may affect the end user's experience with the related content, such as incorrect or expired URLs, incorrectly formatted content, distribution latencies, content synchronization issues, and the like. The reporting system 640 may interface between the devices 310 and the publishing platform 305, receiving the reported user experience issues from the devices 310 and reporting the issues to the publishing platform 305 for logging and repair. The reporting system 640 may also receive inputs from the user interacting with the delivered content, such as searches and user-generated content.

Correlation System

Figure 7:
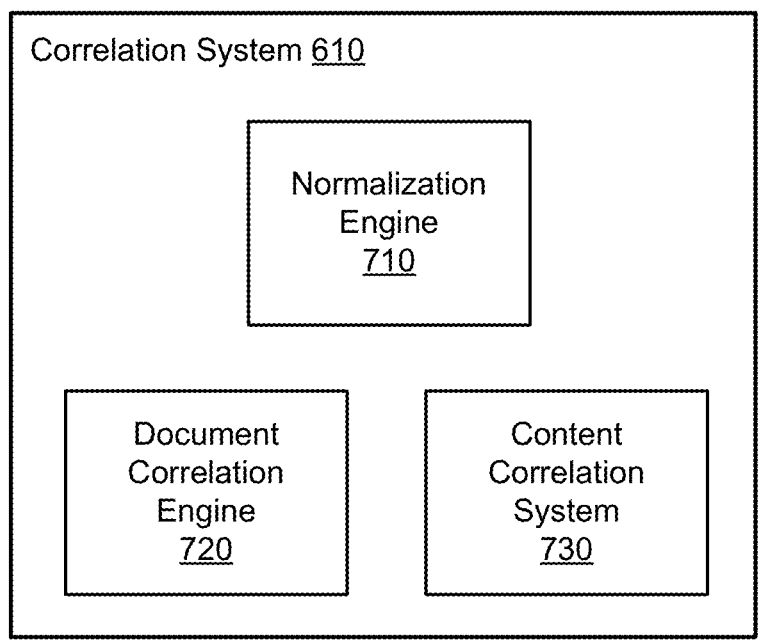
FIG. 7 is a block diagram illustrating subsystems within a document correlation system, according to one embodiment.

FIG. 7 is a block diagram illustrating subsystems within the correlation system 610. In one embodiment, the correlation system 610 comprises a normalization engine 710, a document correlation engine 720, and a content correlation system 730.

The normalization engine 710 performs various pre-processing steps on images of paper documents to prepare at least a portion of each of the respective images for correlation. In one embodiment, the normalization engine 710 normalizes the images of paper document pages uploaded to the platform 305 from user devices 310 to map the uploaded images to the sourced data images in the sourced data repository 225. The normalization engine 710 may verify basic file properties of the uploaded images, checking data integrity for possible corruption and format compliance. Once the uploaded images have been verified, the normalization engine 710 normalizes the image. The normalization engine 710 analyzes and adjusts the spatial resolution, color resolution, and aspect ratio of the uploaded images, removing variability introduced by hardware and software specifications of different user devices. For example, the normalization engine 710 may upsample or downsample the image data of the uploaded images to a fixed spatial resolution, such as the spatial resolution of the sourced data. Similarly, the normalization engine 710 may adjust the color resolution of the image data to the color resolution of the sourced data. The normalization engine 710 may also adjust the aspect ratio of the uploaded images to match the aspect ratio of the sourced data. For example, if the sourced data images are primarily in a portrait orientation, the normalization engine 710 rotates the uploaded images to a portrait orientation. Furthermore, the normalization engine 710 may perform geometric image transformations on the uploaded images to remove geometric distortion. The normalization engine 710 may normalize some or all of an uploaded image. For example, the normalization engine 710 may select one or more regions of the uploaded image to be correlated with sourced data images and normalize the selected regions.

In one embodiment, the normalization engine 710 performs optical character recognition (OCR) on the uploaded image data. The OCR process may be performed on an entire received image, or may be performed on a portion of an image. For example, the normalization engine 710 may apply an OCR process to two non-contiguous strings of characters in each received image.

The document correlation engine 720 correlates the normalized image data to the sourced data images in the sourced data repository 225 to identify the paper document. In one embodiment, the document correlation engine 720 correlates the received image data to the sourced data by an image-based comparison. For example, the document correlation engine 720 may reduce the dimension of the received and sourced data by a linear discriminant analysis (LDA) and principal component analysis (PCA) to determine a low-dimensional structure of the images. The LDA algorithm filters the received and sourced image data and classifies features of the image data. PCA decomposes the features into orthogonal components specific to the layout of the analyzed document pages. The output of the PCA algorithm is a one-dimensional array of the orthogonal components of the sourced page and a one-dimensional array of the orthogonal components of the received page. Using the arrays output by the PCA algorithm, the document correlation engine 720 establishes a correlation factor between the sourced document image and the received document image. For example, a correlation factor of 0 may indicate that the sourced and received images are not correlated, while a correlation factor of 100 indicates that the sourced and received images are identical. If the correlation factor between a sourced document image and a received document image is greater than a threshold, the received document image is determined to match the sourced document image.

In another embodiment, the document correlation engine 720 correlates the received image data with foundation documents by a character-based comparison. The document correlation engine 720 compares string of characters extracted by the OCR process to strings of characters in foundation documents, for example as extracted by text extractor 210 of the publishing system 130. For example, the document correlation engine 720 may compare two non-contiguous strings of characters extracted from the received image data to two strings at corresponding locations in foundation documents. If the compared strings match, the document correlation engine 720 determines that the received document image matches the foundation document. In one embodiment, the document correlation engine 720 determines that two compared strings match if a threshold percentage of characters in the two strings are the same. In one embodiment, the document correlation engine 720 initially compares a first string of characters extracted from the received document image to a string at a corresponding location in a foundation document. If the first string is not unique (e.g., if the first string is contained in multiple sourced document images), the document correlation engine 720 processes a second string extracted from the received document image. Additionally or alternatively, the document correlation engine 720 may process a longer string extracted from the received document image if the first string is not unique.

In one embodiment, the document correlation engine 720 performs the image-based comparison and character-based comparison sequentially. For example, if, after performing the image-based comparison, the image-based correlation factor does not exceed the threshold, the document correlation engine 720 may use a character-based comparison to correlate the received image data to images in the sourced data repository 225. As another example, if, after performing the character-based comparison, the document correlation engine 720 does not uniquely identify a foundation document, the document correlation engine 720 may use the image-based comparison to correlate the received image data to images in the sourced data repository 225.

Using the correlation between sourced data images and received document images established by the image-based comparison and/or the character-based comparison, the document correlation engine 720 identifies the paper document the user is reading. If the paper document includes headings subdividing the document (e.g., chapter headings, sub-chapter headings, appendices, or section titles), the document correlation engine 720 identifies the section of the paper document the user is reading. If the paper document includes multiple pages, the document correlation engine 720 identifies the page the user is reading.

In one embodiment, rather than correlating the received image to images of every page of every foundation document distributed by the publishing platform 305, the document correlation engine 720 prioritizes foundation documents for correlation based on the user's user profile on the publishing platform 305. By prioritizing which documents are correlated to received images, the document correlation engine 720 may perform the correlation process more quickly than if the foundation document were chosen at random. For example, the document correlation engine 720 may retrieve a list of foundation documents purchased by or otherwise entitled to the user from the user profile database 525. When an image of a printed document page is received, the document correlation engine 720 may correlate the received image to images of pages of the foundation documents purchased by the user. Alternatively, the document correlation engine 720 may retrieve a list of documents associated with a user's courses in a current educational cycle (e.g., the current semester) from the user profile database 525. When an image of a printed document page is received, the document correlation engine 720 may correlate the received image to images of pages of the foundation documents used in the user's current courses. As other examples, the document correlation engine 720 may correlate the received images of images of foundation documents used by social network connections of the user, or foundation documents whose subject matter relates to the user's major. In one embodiment, the document correlation engine 720 progressively expands scope of foundation documents to correlate with the received images. For example, the document correlation engine 720 may first correlate images with foundation documents entitled to the user. If a sufficiently high correlation factor is not found, the document correlation engine 720 may next correlate the received images with foundation documents related to courses in which the user is enrolled, then with foundation documents used by social network connections of the user. Finally, if a sufficiently high correlation factor has still not been generated, the document correlation engine 720 may correlate the received image with every foundation document distributed by the platform 305.

Additionally or alternatively, the document correlation engine 720 may correlate the received image to the most recent foundation document the user has accessed. For example, if the user most recently retrieved content related to a "Biology 101" textbook, the document correlation engine 720 may correlate the received image with pages of "Biology 101" before correlating the received image with pages of other foundation documents. As another example, if an image of page 5 of "Biology 101" was recently received (e.g., if less than a threshold length of time has elapsed since the image of the page was received), the document correlation engine 720 may correlate the received image with pages of "Biology 101" that are close to page 5 (e.g., pages 6-10).

The content correlation system 730 identifies content related to the paper document. In one embodiment, after the document correlation engine 720 identifies the paper document by correlating the image of the paper document with images of foundation documents, the content correlation system 730 searches the catalog database 530 for content related to the paper document that is available to the user who uploaded the image. The content correlation system 730 may search for various types of content associated with the foundation document, such as content purchased by the user through the publishing platform 305 (e.g., a study guide), user-generated content (e.g., notes), content generated by the publishing platform 305 (e.g., an automated terms listing), or content uploaded to the publishing platform 305 for distribution to one or more users (e.g., a quiz). As such, the content correlation system 730 interfaces between the document correlation engine 720 and the catalog database 530.

Distributing Electronic Content Related to Paper Documents

Figure 8:
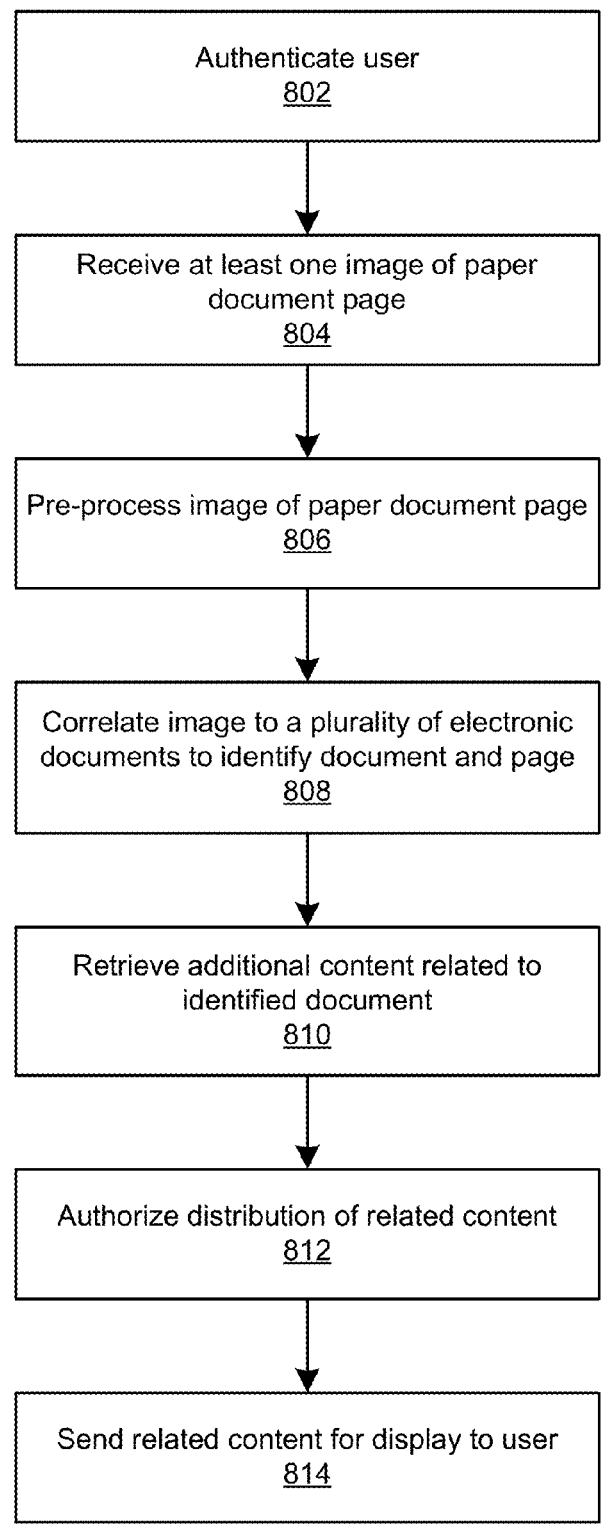
FIG. 8 is a flowchart illustrating a process for distributing electronic content related to paper documents, according to one embodiment.

FIG. 8 is a flowchart illustrating a process for distributing electronic content related to paper documents, according to one embodiment. In one embodiment, the steps of the process are performed by the augmented reading system 520. Other embodiments may include different and/or additional steps, and the steps of the process may be performed in different orders.

The augmented reading system 520 receives login credentials from a device 310 of a user reading a paper document. Using the login credentials, the augmented reading system 520 authenticates 802 the user and establishes an authenticated web session on the device 310 through browser executing on the device 310. Thus, the device 310 is a connected device communicatively coupled to the augmented reading system 520. In one embodiment, the augmented reading system 520 retrieves profile data, such as profile data identifying documents the user is entitled to access, while authenticating 802 the user.

During the authenticated web session executing on the device 310, the augmented reading system 520 receives 804 an image of at least a portion of a page of the paper document from the device 310 of the user. For example, the augmented reading system 520 may receive an image of a page of a textbook or trade book, a portion of a map, or a redacted financial summary.

The augmented reading system 520 pre-processes 806 the received image to prepare the image for correlation. For example, the augmented reading system 520 may normalize the image to adjust spatial resolution, color resolution, and aspect ratio of the received image to match the corresponding specifications of the sourced data images. In one embodiment, the augmented reading system 520 may also perform OCR on a portion of the received image to extract two or more non-contiguous strings of characters from the received image.

The augmented reading system 520 correlates 808 the pre-processed image to electronic foundation documents stored and distributed by the publishing platform 305. In one embodiment, correlation 808 comprises an image-based correlation, in which the augmented reading system 520 compares principal components of the received image to principal components of the sourced data images. Alternatively, correlation 808 may comprise a character-based correlation, in which the augmented reading system 520 compares strings of characters extracted from the received image to strings of characters in the foundation documents. In one embodiment, the augmented reading system 520 selects a subset of foundation documents of the platform 305 based on the user login credentials, and correlates 808 the pre-processed images to the selected subset. For example, the augmented reading system 520 may correlate 808 the pre-processed image with documents the user has purchased or documents associated with educational courses in which the user is currently enrolled. If correlation is successful, the augmented reading system 520 identifies a foundation document corresponding to the paper document the user is reading.

After identifying the foundation document, the augmented reading system 520 retrieves 810 additional electronic content related to the identified foundation document. In various examples, the additional electronic content may comprise user-generated notes, a listing of terms and definitions, an educational test or assignment, content redacted from the paper document, an advertisement, multimedia content, a platform service such as a search tool or an online store, or a social networking service.

In one embodiment, the augmented reading system 520 authorizes 812 the distribution of the related content to the user. Authorization 812 may be dependent on access conditions of the related content. For example, the augmented reading system 520 may authorize 812 the distribution of the related content if the user has purchased the related content or if the received user login credentials match login credentials in a user profile. As another example, the augmented reading system 520 may authorize 812 the distribution of the related content if the login credentials are found in a pre-determined list of users who are authorized to access the related content, such as users with a threshold security clearance in an organization or students who are registered for a particular educational course. As yet another example, the augmented reading system 520 may compare an uploaded image of the user's face to a reference image in the user's profile, and authorize 812 the distribution if the uploaded image matches the reference image. Depending on the access conditions for the related content, the augmented reading system 520 may periodically re-authorize the distribution of the related content.

If the distribution is authorized 812, the augmented reading system 520 sends 814 the related content for display to the user. The augmented reading system 520 may send 814 the related content to the device from which the image of the paper document was received, or may send 814 the related content to another device of the user that is communicatively coupled to the publishing platform 305. If the augmented reading system 520 identifies several related content items associated with the paper document that are available to the user, the augmented reading system 520 may send the user a list of the available items. The user may then select one or more desired related content items to be delivered to the user's device 310. In response to receiving the user's selection, the augmented reading system 520 sends 814 the selected related content items to a connected device of the user.

One or more steps of the process illustrated in FIG. 8 may be repeated indefinitely throughout a web session. For example, as the user continues to read the paper document or begins reading a different paper document, the user may upload a second image of a portion of a page of the paper document to access related content. The augmented reading system 520 receives 804 the second image and performs steps 806 through 814 to distribute related content to the user. Alternatively, after receiving a first image of a page of a paper document, the augmented reading system 520 may send related content to the user in response to user requests without processing additional images from the same document. For example, if the user previously uploaded an image of page 10 of a paper document, the user may select "Next Page" in the browser application 170 to retrieve electronic content related to page 11 of the document without uploading an image of page 11.

After a period of time, the user device 310 ends the authenticated web session. A web session may end in response to user activities (e.g., the user closing the browser application executing on the device 310), or may end after a fixed period of time defined by the publishing platform 305. For example, the web session may end if the user does not request new related content before a timeout period has elapsed. In one embodiment, if the user desires to access content after the web session has ended, the publishing platform 305 re-establishes an authenticated web session on the device 310 prior to performing the steps illustrated in FIG. 8.

One example implementation of the augmented reading system 520 described herein provides access to user-generated notes. For example, a user reading a paper textbook desires to access his electronic notes associated with the textbook. To access the notes, he captures an image of the page he is reading with his smart phone and uploads the image to the augmented reading system 520. The augmented reading system 520 receives the image of the page and an identifier of the user, identifies the textbook by correlating the image with images of books in the catalog database 530, and retrieves the user's notes associated with the identified textbook. The notes are distributed to the user's smart phone (or another connected device), where the user can view the notes, search the notes, or add new notes. For example, the user can add a note associated with the section of the textbook the user is currently reading by capturing an image of the section and typing desired note content. When the image and note content are uploaded to the publishing platform 305, the notepad system 505 stores the note in the user's notepad document and links the note to the section of the textbook identified in the captured image.

As another example, a user reading a paper book retrieves activities of his social network connections that are related to the paper book by capturing an image of a page of the book and uploading the image to the augmented reading system 520. The augmented reading system 520 identifies social network connections of the user from the user's profile on the publishing platform 305, and retrieves recent activities of the connections. For example, the augmented reading system 520 may retrieve notes or highlights created by the connections and associated with the page of the book the user is reading. The retrieved social content is distributed to the user's device.

In another example, a textbook publisher supplements printed textbooks with related electronic content distributed through the publishing platform 305. For example, the textbook publisher may produce videos explaining or demonstrating key concepts in the textbook, add links to academic papers describing concepts in further detail, or provide step-by-step solutions to problems in the textbook. Similarly, an instructor of an educational course may publish study questions for students to complete while reading the course's textbook. To access the supplemental content, a user reading the paper textbook can upload an image of the page she is reading to the augmented reading system 520. The augmented reading system 520 identifies the textbook, retrieves the supplemental content, and distributes the supplemental content to the user.

In a further example, rather than producing separate editions of a textbook for instructors and students, a textbook publisher prints and sells a single edition of a textbook suitable for student use. If an instructor wishes to access instructor-specific material (such as suggestions for teaching particular concepts, explanatory notes, solutions to problems in the textbook, or sample test questions), the instructor captures an image of a page of the textbook via a device 310 executing an authenticated web session and uploads the image to the augmented reading system 520. After identifying the document page and authorizing the instructor for accessing the instructor-specific content, the augmented reading system 520 distributes the instructor-specific material to the instructor to use in conjunction with the textbook.

In yet another example, a user reading a long document desires to search for a particular term in the document. The user captures an image of a page of the document via a computing device, and uploads the image and a search query to the augmented reading system 520. The augmented reading system 520 returns a list of pages on which the term in the search query occurs in the document.

In a still further example, a banking system generates a bank statement for a customer of the bank. The banking system redacts sensitive data from the bank statement before the statement is mailed to the customer. When the customer receives the bank statement, the customer captures an image of the statement using a connected device and uploads the image to the banking system. After identifying the customer and the bank statement in the captured image, the banking system distributes the redacted content to the customer. Accordingly, the content of the bank statement is secured while in the mail, but the customer can view the statement's content without hindrance.

Still further, a company distributes financial reports by paper to its executives and investors. Prior to distribution, confidential information is redacted from the financial reports. The redacted content is not made available to a user until the user captures an image of the paper document and uploads the image to the augmented reading system 520 via a connected device. When a user receives the financial report, the user captures an image of the document via a connected device and uploads the image to the augmented reading system 520. The system 520 identifies the user and determines whether the user is authorized to view the redacted content of the report. If the user is authorized, the server sends the redacted content to the user's connected device. Accordingly, the confidential information of the financial reports is secured by two levels of protection: a user must have a physical copy of the redacted report and must be authorized by the augmented reading system 520 to access the content redacted from the report.

As demonstrated by these examples, embodiments of the augmented reading system as described herein provide a bridge between printed content and digital content and services. The system beneficially provides users with the convenience of printed content but the security of digital. Moreover, the augmented reading system enables owners of digital content services associated with published documents to decouple the monetization of their services from users' purchases of the published documents.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for distributing electronic content related to paper documents, the method comprising:
    receiving at a server, an image of at least a portion of a page of a paper document, the image captured by a device of a user reading the paper document, the device communicatively coupled to the server;
    determining a page layout of the page of the paper document based on the image, the page layout including a spatial arrangement of elements of the paper document with respect to the page;
    correlating the page layout of the page of the paper document with page layouts of a plurality of electronic documents by an image based comparison, each electronic document comprising markup language page elements that collectively reconstruct the electronic document while preserving page layouts of a corresponding paper document, the correlating further comprising:
using linear discriminant analysis to determine low-dimensional structures of the received image and of the plurality of electronic documents; and
establishing a correlation factor between the received image and each of the plurality of electronic documents, the correlation factor based upon the low-dimensional structures;
identifying, based on the correlation, one of the electronic documents best matching the page of the paper document;
retrieving additional electronic content related to the identified document; and
sending the additional electronic content to a connected device of the user for display to the user.

2. The method of claim 1, further comprising:
identifying at least two strings of characters in the image; and
correlating the strings of characters in the image with strings of characters in the plurality of electronic documents;
wherein the page of the paper document is further identified based on the correlation of the strings of characters in the image with strings of characters in the plurality of electronic documents.

3. The method of claim 1, wherein correlating the page layout of the paper document with the page layouts of the plurality of electronic documents comprises:
correlating the page layout of the paper document with page layouts of electronic documents corresponding to paper documents entitled to the user.

4. The method of claim 1, wherein correlating the page layout of the paper document with the page layouts of the plurality of electronic documents comprises:
correlating the page layout of the paper document with page layouts of electronic documents used in educational courses in which the user is enrolled.

5. The method of claim 1, wherein receiving the image comprises:
receiving an identifier of the user; and
authenticating the user based on the received identifier.

6. The method of claim 1, wherein the additional electronic content is a test related to the identified document.

7. The method of claim 1, wherein the additional electronic content comprises user-generated content associated with the identified page.

8. The method of claim 1, wherein the additional electronic content comprises a terms listing associated with the identified document.

9. The method of claim 1, wherein the paper document is a published, educational document.

10. The method of claim 1, wherein determining the page layout of the page of the paper document comprises:
filtering the image to identify a plurality of elements on the page and an arrangement of the identified elements; and
identifying principal components of the arrangement of the identified elements;
wherein correlating the page layout of the page of the paper document with page layouts of a plurality of electronic documents comprises correlating the principal components of the image with principal components of pages of the electronic documents.

11. The method of claim 1, further comprising:
receiving an image of a user;
comparing the image of the user to a reference image of the user; and
determining that the user in the image of the user matches the user in the reference image of the user;
responsive to determining that the user in the image of the user matches the user in the reference image of the user, performing the sending.

12. The method of claim 1, wherein sending the additional electronic content to a connected device of the user comprises:
distributing the additional electronic content by populating regions of a template with portions of the content, the template being a formatted document designed for display on a connected device of the user with regions configured to receive electronic content.

13. The method of claim 1, further comprising:
normalizing the received image, the normalization preparing at least a portion of the image for correlation.

14. The method of claim 13, wherein the normalization further comprises:
verifying file properties of the image;
checking data integrity of the image against corruption; and
checking format compliance of the image.

15. The method of claim 1, wherein the correlating uses principal component analysis, in addition to linear discriminant analysis, to determine the low-dimensional structures.

16. The method of claim 1, further comprising:
receiving, in addition to the received image, a search term;
identifying, within the identified document, a set of pages in which the search term appears; and
sending the set of pages to a connected device of the user for display to the user.

17. The method of claim 1, wherein determining the page layout of the page of the paper document based on the image is done by an image-based comparison without text recognition.

18. The method of claim 1, wherein correlating the page layout of the paper document with page layouts of the plurality of electronic documents comprises:
correlating the received image to the electronic documents in order of recency of the user accessing the electronic documents.

19. A system for distributing electronic content related to paper documents, the system comprising:
a correlation system configured for:
receiving an image of at least a portion of a page of a paper document, the image captured by a device of a user reading the paper document;
determining a page layout of the page of the paper document based on the image, the page layout including a spatial arrangement of elements of the paper document with respect to the page;
correlating the page layout of the page of the paper document with page layouts of a plurality of electronic documents by an image based comparison, each electronic document comprising markup language page elements that collectively reconstruct the electronic document while preserving page layouts of a corresponding paper document, the correlating further comprising:
using linear discriminant analysis to determine low-dimensional structures of the received image and of the plurality of electronic documents; and establishing a correlation factor between the received image and each of the plurality of electronic documents, the correlation factor based upon the low-dimensional structures;

identifying, based on the correlation, the page of the paper document;

retrieving additional electronic content related to the identified document; and a distribution system configured for sending the additional electronic content to a connected device of the user for display to the user.

20. The system of claim 19, wherein determining the page layout of the page of the paper document comprises:

filtering the image to identify a plurality of elements on the page and an arrangement of the identified elements; and identifying principal components of the arrangement of the identified elements;

wherein correlating the page layout of the page of the paper document with page layouts of a plurality of electronic documents comprises correlating the principal components of the image with principal components of pages of the electronic documents.

21. A method for distributing electronic content related to paper documents, the method comprising:

indexing contents of a plurality of electronic documents into sections;

receiving user-generated notes;

linking the user-generated notes to corresponding ones of the sections;

for each of the electronic documents, aggregating the indexed content and sections into a table of contents;

receiving at a server, an image of at least a portion of a page of a paper document, the image captured by a device of a user reading the paper document, the device communicatively coupled to the server;

determining a page layout of the page of the paper document based on the image, the page layout including a spatial arrangement of elements of the paper document with respect to the page;

correlating the page layout of the page of the paper document with page layouts of a plurality of electronic documents by an image based comparison, each electronic document comprising markup language page elements that collectively reconstruct the electronic document while preserving page layouts of a corresponding paper document;

identifying, based on the correlation, a section of one of the electronic documents best matching the page of the paper document;

retrieving user-generated notes linked to the section of the electronic document based on the index of the table of contents; and sending the user-generated notes to a connected device of the user for display to the user.

* * * * *